UNITED STATES PATENT OFFICE 2,615,886

10-PYRROLIDINOACYL-PHENOTHIAZINES AND SALTS THEREOF

Johan Richard Dahlbom and Torsten Karl Ivar Bernhard Ekstrand, Sodertalje, Sweden, assignors to Aktiebolaget Astra, Apotekarnes Kemiska Fabriker, Sodertalje, Sweden, a company of Sweden No Drawing. Application January 10, 1951, Serial No. 205,426

7 Claims. (Cl. 260—243)

This invention relates to a new class of chemical compounds of high therapeutic value. The compounds may be represented by the following general formula

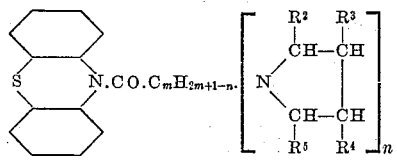

where $m$ is an integer from 1 to 3, $n$ is an integer from 1 to 2, and $R^2$, $R^3$, $R^4$ and $R^5$ are each hydrogen or a methyl or ethyl group. The compounds of this invention may each be obtained as a free base having the formula given above, or they may be obtained in the form of acid addition salts of an inorganic or organic acid.

In vitro experiments on isolated small intestine of guinea pig with the compounds of this invention prove that they are very active in preventing the smooth muscle spasm induced by acetyl choline and barium chloride. In the former case the most active of the compounds have seven-tenths of the effect of atropine, and in the latter case the most active of the compounds are sixty times more effective than papaverine. Furthermore, they have a very low toxicity.

We do not desire to limit this invention to any particular method for the preparation of the compounds. They may, however, be readily obtained by reacting a 10-halogenacylphenothiazine, such as chloroacetylphenothiazine, β-chloropropionylphenothiazine, α-bromopropionylphenothiazine, α,β-dibromopropionylphenothiazine, α-bromobutyrylphenothiazine, β-bromobutyrylphenothiazine, β-bromoisobutyrylphenothiazine, or γ-bromobutyrylphenothiazine, with pyrrolidine or a suitable substituted pyrrolidine, in the presence of a suitable solvent.

The compounds may readily be converted into addition salts by dissolving the base in a suitable solvent and adding a solution of the appropriate acid, for instance hydrochloric acid, sulphuric acid, nitric acid, acetic acid, oxalic acid, citric acid, maleic acid, and so forth.

Our invention may be further illustrated by the following examples for the preparation of the new compounds.

*Example 1.—Preparation of 10-(pyrrolidinoacetyl)-phenothiazine*

185 g. pyrrolidine and 276 g. 10-chloroacetylphenothiazine were dissolved in 2500 ml. toluene and heated under reflux for four hours. After cooling the solution the precipitated pyrrolidine hydrochloride was separated and collected, and the filtrate was evaporated to dryness. The crystalline residue—yield 170 g.—was recrystallized from a mixture of five parts of light petroleum and one part ethanol. The pure 10-pyrrolidinoacetyl-phenothiazine obtained in this way melts at 142–142.5° C.

*Example 2.—Preparation of 10-(α-pyrrolidinopropionyl)-phenothiazine*

185 g. pyrrolidine and 334 g. 10-(α-bromopropionyl)-phenothiazine were refluxed in 2500 ml. toluene for three hours. The product was isolated in the same way as in Example 1. Yield of 10-(α-pyrrolidinopropionyl)-phenothiazine 272 g. Melting point 94.5–95.5° C. after recrystallization from light petroleum.

*Example 3.—Preparation of 10-(β-pyrrolidinopropionyl)-phenothiazine*

278 g. pyrrolidine and 430 g. 10-(β-chloropropionyl)-phenothiazine were refluxed in 2500 ml. toluene for four hours. After filtration to remove pyrrolidine hydrochloride the filtrate was extracted with N-hydrochloric acid. The extract was made alkaline with sodium carbonate, and the crystalline precipitate, which consists of 10-(β-pyrrolidinopropionyl)-phenothiazine, was collected. Yield 450 g. The compound was recrystallized from a mixture of five parts of light petroleum and one part ethanol. Melting point 108–109° C.

*Example 4.—Preparation of 10-(α-pyrrolidinobutyryl)-phenothiazine*

278 g. pyrrolidine and 520 g. 10-(α-bromobutyryl)-phenothiazine were refluxed in 2500 ml. toluene for seven hours. The base, 10-(α-pyrrolidinobutyryl)-phenothiazine, was isolated as in Example 3. As it did not crystallize, it was dissolved in dry ether, and dry hydrogen chloride was added to the solution until the precipitation of the hydrochloride was complete. The hydrochloride was recrystallized from acetone. Melting point 206–208° C.

*Example 5.—Preparation of 10-(γ-pyrrolidinobutyryl)-phenothiazine*

278 g. pyrrolidine and 520 g. 10-(γ-bromobutyryl)-phenothiazine were refluxed in 2500 ml. toluene for three hours. The base was isolated as in Example 3. The product, 10-(γ-pyrrolidinobutyryl)-phenothiazine, was recrystallized from a mixture of ethanol and light petroleum. Melting point 106–107° C. The oxalate, prepared as mentioned above, melts at 161–162° C.

*Example 6.—Preparation of 10-(α,β-dipyrrolidinopropionyl)-phenothiazine*

370 g. pyrrolidine and 410 g. 10-(α,β-dibromopropionyl)-phenothiazine were refluxed in 4000 ml. toluene for three hours. The base was isolated as in Example 3. The product, 10-(α,β-dipyrrolidinopropionyl)-phenothiazine, was recrystallized from light petroleum. Melting point 102–104° C.

The process described in each of the above examples may be carried out in an analogous manner with the use, in place of unsubstituted pyrrolidine, of substituted pyrrolidines, for example:

2-methylpyrrolidine
2-ethylpyrrolidine
3-methylpyrrolidine
2,4-dimethylpyrrolidine
2,5-dimethylpyrrolidine whereby the corresponding substituted pyrrolidinoacylphenothiazines are produced.

What we claim as our invention is:

1. A compound of the class consisting of a free base and its salts, said free base having the formula

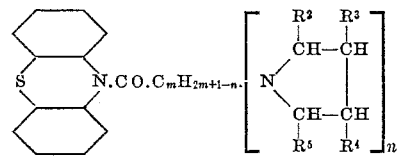

where $m$ is an integer from 1 to 3, $n$ is an integer from 1 to 2, and $R^2$, $R^3$, $R^4$ and $R^5$ are each selected from the group consisting of hydrogen and methyl groups.

2. The hydrochloride salt of a compound having the following formula for the free base

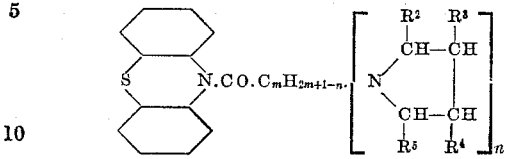

where $m$ is an integer from 1 to 3, $n$ is an integer from 1 to 2, and $R^2$, $R^3$, $R^4$ and $R^5$ are each selected from the group consisting of hydrogen and methyl groups.

3. 10-(pyrrolidinoacetyl)-phenothiazine.
4. 10-(α-pyrrolidinopropionyl)-phenothiazine.
5. 10-(β-pyrrolidinopropionyl)-phenothiazine.
6. 10-(α-pyrrolidinobutyryl)-phenothiazine.
7. 10-(γ-pyrrolidinobutyryl)-phenothiazine.

JOHAN RICHARD DAHLBOM.
TORSTEN KARL IVAR BERNHARD EKSTRAND.

REFERENCES CITED

The following references are of record in the file of this patent:

FOREIGN PATENTS

| Number | Country | Date |
|---|---|---|
| 46 | Philippines | Jan. 12, 1950 |

OTHER REFERENCES

Ekstrand, Chem. Abstracts, vol. 43, p. 7938 (1949).

Idson, Chem. Reviews, vol. 47, No. 3, pp. 352, 493, 494 (1950).